US012655295B2

(12) United States Patent
Rosenmayer

(10) Patent No.: US 12,655,295 B2
(45) Date of Patent: Jun. 16, 2026

(54) ASPHALT MODIFIER COMPOSITION AND RUBBER-MODIFIED ASPHALT HAVING INCREASED STORAGE STABILITY

(71) Applicant: LEHIGH TECHNOLOGIES, INC., Tucker, GA (US)

(72) Inventor: Charles Thomas Rosenmayer, Decatur, GA (US)

(73) Assignee: Liberty Tire Recycling, LLC, Pittsburgh, PA (US)

( * ) Notice: Subject to any disclaimer, the term of this patent is extended or adjusted under 35 U.S.C. 154(b) by 733 days.

(21) Appl. No.: 17/434,554

(22) PCT Filed: Feb. 28, 2019

(86) PCT No.: PCT/US2019/020035
§ 371 (c)(1),
(2) Date: Aug. 27, 2021

(87) PCT Pub. No.: WO2020/176101
PCT Pub. Date: Sep. 3, 2020

(65) Prior Publication Data
US 2022/0135802 A1     May 5, 2022

(51) Int. Cl.
*C08L 95/00*     (2006.01)

(52) U.S. Cl.
CPC ........... *C08L 95/00* (2013.01); *C08L 2205/03* (2013.01); *C08L 2207/20* (2013.01);
(Continued)

(58) Field of Classification Search
CPC .. C08L 95/00; C08L 2205/03; C08L 2207/20; C08L 2255/64; C08L 17/00; C08L 91/00
See application file for complete search history.

(56) References Cited

U.S. PATENT DOCUMENTS

| | | | |
|---|---|---|---|
| 5,322,867 | A | 6/1994 | Kluttz |
| 7,160,935 | B2 | 1/2007 | Prejean |

(Continued)

FOREIGN PATENT DOCUMENTS

| | | |
|---|---|---|
| CN | 101155880 A | 4/2008 |
| CN | 102174268 A | 9/2011 |

(Continued)

OTHER PUBLICATIONS

Chinese Office Action Corresponding to Application No. 201980095672.6 on Jan. 19, 2023.

(Continued)

*Primary Examiner* — Catherine S Branch
*Assistant Examiner* — Olga Lucia Donahue
(74) *Attorney, Agent, or Firm* — Leech Tishman Fuscaldo & Lampl, LLC

(57) ABSTRACT

Asphalt modifier packages and rubber-modified asphalts including the packages are described. Asphalt modifier packages can include an amine functionalized wax and an elastomeric polymer in conjunction with ground tire rubber. Asphalt modifiers can include a ground tire rubber compounded with a reactive elastomeric terpolymer. Rubber-modified asphalts can exhibit an excellent stability of the ground tire rubber additive. Rubber-modified asphalts can exhibit a storage stability separation factor of about 6° F. or less, an MSCR $J_{nr}$ value of from about 0.05 to about 2 at 3.2 kPa and 67° C., and an MSCR percent recovery of from about 20% to about 75% at 3.2 kPa and 67° C.

14 Claims, 2 Drawing Sheets

(52) U.S. Cl.
CPC ....... *C08L 2555/34* (2013.01); *C08L 2555/64* (2013.01); *C08L 2555/72* (2013.01); *C08L 2555/84* (2013.01); *C08L 2555/86* (2013.01)

(56) References Cited

U.S. PATENT DOCUMENTS

| | | | |
|---|---|---|---|
| 7,445,170 | B2 | 11/2008 | Cialone et al. |
| 7,861,958 | B2 | 1/2011 | Waznys et al. |
| 8,404,164 | B2 | 3/2013 | Sockwell |
| 8,784,554 | B2 | 7/2014 | Naidoo et al. |
| 9,212,264 | B2 | 12/2015 | Blacklidge et al. |
| 9,605,152 | B2 | 3/2017 | Ruan et al. |
| 10,000,638 | B2 | 6/2018 | Pillai et al. |
| 2002/0086911 | A1 | 7/2002 | Rouse et al. |
| 2008/0153945 | A1 | 6/2008 | Prejean et al. |
| 2010/0286319 | A1* | 11/2010 | Fell ........................... C08F 8/30 |
| | | | 524/592 |
| 2015/0105496 | A1* | 4/2015 | Naidoo ................... C08L 23/10 |
| | | | 523/438 |
| 2015/0191597 | A1 | 7/2015 | Hacker et al. |
| 2016/0145436 | A1* | 5/2016 | Trumbore ............... E04D 11/02 |
| | | | 106/270 |
| 2016/0297969 | A1 | 10/2016 | Naidoo et al. |
| 2018/0312694 | A1* | 11/2018 | Naidoo ................... C08L 23/00 |

FOREIGN PATENT DOCUMENTS

| | | |
|---|---|---|
| CN | 102443270 A | 5/2012 |
| CN | 104449173 A | 3/2015 |
| CN | 105778530 A | 7/2016 |
| CN | 106497103 A | 3/2017 |
| CN | 106574123 A | 4/2017 |
| JP | S5785855 A | 5/1982 |
| JP | H08503237 A | 4/1996 |
| JP | H1129665 A | 2/1999 |
| JP | 2000230055 A | 8/2000 |
| JP | 2003064156 A | 3/2003 |
| JP | 2013173824 A | 9/2013 |
| JP | 2017503068 A | 1/2017 |
| WO | WO 2006/107908 | 10/2006 |
| WO | WO 2007/068990 A1 | 6/2007 |
| WO | WO 2012/033490 | 3/2012 |

OTHER PUBLICATIONS

Japanese Office Action Corresponding to Application No. 2021-550685 on Feb. 27, 2023.

European Office Action Corresponding to Application No. 19710930 on Nov. 15, 2023.

Aashto. "Standard Specification for Performance-Graded Asphalt Binder Using Multiple Stress Creep Recovery (MSCR) Test" *Am. Assoc. State Hwy. Transp. Off.* M 332/MP 19 (2013) pp. 1-7.

Aashto. "Standard Method of Test for Determining the Rheological Properties of Asphalt Binder Using a Dynamic Shear Rheometer (DSR)" *Am. Assoc. State Hwy. Transp. Off.* T 315 (2013) pp. 1-32.

Aashto. "Standard Method of Test for Viscosity Determination of Asphalt Binder Using Rotational Viscometer" *Am. Assoc. State Hwy. Transp. Off.* T 316 (2013) pp. 1-19.

ASTM. "Standard Test Method for Drop Melting Point of Petroleum Wax, Including Petrolatum" *ASTM, Int'l* D127 (1999) pp. 1-2.

ASTM. "Standard Test Method for Needle Penetration of Petroleum Waxes" *ASTM, Int'l* D1321 (2016) only).

ASTM. "Standard Test Method for Softening Point of Bitumen (Ring-and-Ball Apparatus)" *ASTM, Int'l* D36 (1995) pp. 1-4.

ASTM. "Standard Test Methods for Vulcanized Rubber and Thermoplastic Elastomers-Tension" *ASTM, Int'l* D412 (2006) pp. 1-14.

ASTM. "Standard Test Method for Kinematic Viscosity of Transparent and Opaque Liquids (and Calculation of Dynamic Viscosity)" *ASTM, Int'l* D445 (2006) pp. 1-10.

ASTM. "Standard Classification for Rubber Compounding Materials—Recycled Vulcanizate Rubber" *ASTM, Int'l* D5603 (2015) pp. 1-4. (Abstract only).

ASTM. "Standard Test Method for Rubber Compounding Materials-Determination of Particle Size Distribution of Recycled Vulcanizate Particulate Rubber" *ASTM, Int'l* D5644 (2018) pp. 1-3. (Abstract only).

ASTM. "Standard Test Method for Color of Petroleum Products by the Automatic Tristimulus Method" *ASTM, Int'l* D6045 (2017) pp. 1-8. (Abstract only).

ASTM. "Determining Separation Tendency of Polymer from Polymer Modified Asphalt" *ASTM, Int'l* D7173 (2014) pp. 1-2. (Abstract only).

ASTM. "Standard Test Method for Congealing Point of Petroleum Waxes, Including Petrolatum" *ASTM, Int'l* D938 (2012) pp. 1-3.

ASTM. "Standard Test Method for Poisson's Ratio at Room Temperature" *ASTM, Int'l* E132 (2017) pp. 1-4.

Bulatovic, et al. "Rheological Properties of Bitumen Modified with Ethylene Butylacrylate Glycidylmethacrylate" *Polym. Eng. Sci.* 54 (2014) pp. 1056-1065.

Dow. "Elvaloy™ 4170 Copolymer Technical & Safety Data Sheets" Dow Chemical Co. (2019) pp. 1-13.

Dow. "Elvaloy™ 5170 Copolymer Technical & Safety Data Sheets" Dow Chemical Co. (2019) pp. 1-13.

ExxonMobil. "Vistamaxx™ Performance Polymer Product Data Sheets" ExxonMobil Corp. 6102/6202/6502 (2020) pp. 1-6.

Formela, et al. "Assessment of microstructure, physical and thermal properties of bitumen modified with LOPE/CTR/elastomer ternary blends" *Constr. Bldg. Mater.* 106 (2016) pp. 160-167.

Grigoryeva, et al. "Reactive Compatibilization of Recycled Polyethylenes and Scrap Rubber in Thermoplastic Elastomers: Chemical and Radiation-Chemical Approach" *Rubb. Chem. Tech.* 81 (2008) pp. 737-752.

Guo, et al. "Thermoplastic Elastomers Derived from Scrap Rubber Powder/LLDPE Blend with LLDPE-graft-(Epoxidized Natural Rubber) Dual Compatibilizer" *Macromol. Mater. Eng.* 289 (2004) pp. 360-367.

Karger-Kocsis, et al. "Ground tyre rubber (GTR) in thermoplastics, thermosets, and rubbers" *J. Mater. Sci.* 48 (2013) pp. 1-38.

Lehigh Technologies®. "MicroDyne™. 400 Product Specification" Lehigh Technologies, Inc. MD-400-TR (2017) p. 1.

Liu, et al. "Reactive Polymers for Blend Compatibilization" *Adv. Polym. Tech.* 11 (1992) pp. 249-262.

Polacco, et al. "A review of the fundamentals of polymer-modified asphalts: Asphalt/polymer interactions and principles of compatibility" *Adv. Coll. Interf. Sci.* 224 (2015) pp. 72-112.

Qin, et al. "Blending LLDPE and Ground Rubber Tires" *Poly-Plast. Tech. Eng.* 47 (2008) pp. 199-202.

Sasol. "Fischer-Tropsch Hard Waxes" Sasol Ltd. (2018) pp. 1-2.

Sasol. "Sasobit®" *Sasol Perf. Chem.—Wax Div.* (2018) pp. 1-10.

Sasol. "Sasolink®" *Sasol Perf. Chem.—Wax Div.* (2018) pp. 1-2. (Abstract only).

STRUKTOL®. "Struktol® TR 016 Technical Data" Struktol Co. of America, LLC (2018) p. 1.

Tolstov, et al. "Reactive Compatibilization of Polyethylene/Ground Tire Rubber Inhomogeneous Blends via Interactions of Pre-Functionalized Polymers in Interface" *Macromol. Symp.* 254 (2007) pp. 226-232.

Trecora™ "CWP500 Crystalline High Melting Point HDPE Wax" Trecora Chemical, Inc. (2018) pp. 1-9.

Vachhani, et al. "Influence of VG30 Grade Bitumen with and without reactive Ethylene Terpolymer (Elvaloy® 4170) in short term aging" *Int'l J. Curr. Eng. Tech.* 4 (2014) pp. 4206-4209.

Wang, et al. "Crumb Tire Rubber Polyolefin Elastomer Modified Asphalt with Hot Storage Stability" *Prog. Rubb. Plast. Recyl. Tec.* 32 (2016) pp. 25-38.

Wikipedia. "Montan Wax" Wikipedia (2021) p. 1.

ISA. "International Search Report & Written Opinion" PCT/US2019/020035 (Jul. 17, 2019) pp. 1-23.

\* cited by examiner

ASPHALT MODIFIER COMPOSITION AND RUBBER-MODIFIED ASPHALT HAVING INCREASED STORAGE STABILITY

BACKGROUND

Asphalt, also known as bitumen, is a highly viscous liquid or semi-solid material comprised primarily of naphthene aromatics, polar aromatics, saturated hydrocarbons, and asphaltenes. Asphalt can be found in natural deposits but is also derived through separation from other crude oil components during refining processes. Asphalt has been used in water proofing and as a binder since ancient times. In modern times, asphalt is commonly used as an aggregate binder in asphalt cement for pavement, as well as in roofing, applications.

Modifiers to asphalt have been developed in order to improve various characteristics of asphalt-containing products. For instance, asphalt, whether natural or refinery derived, does not provide desired resistance to cracking and deformation over long-term application in challenging environments (e.g., high traffic, heavy load, high temperature, etc.). Polymeric modifiers in particular have shown efficacy in improving asphalt characteristics such as rut resistance, fatigue resistance, and cracking resistance.

Ground tire rubber (GTR) (also commonly referred to as crumb rubber or recycled tire rubber) has shown great promise as a particulate asphalt modifier. The addition of GTR to asphalt can improve resistance to rutting, cracking and deformation, as well as provide reduction of road noise in pavement applications. Moreover, inclusion of recycled rubber materials as an asphalt modifier provides an excellent use for post-consumer scrap alleviating rubber disposal issues; this can also decrease the amount of virgin polymer asphalt modifiers necessary to obtain desired characteristics.

Unfortunately, GTR particles can settle out of the blended asphalt composition and the ability to form and store a homogenous asphalt/GTR mixture remains a serious issue preventing more widespread adoption of an otherwise excellent asphalt modifier. Attempts have been made to address this problem, for instance through utilization of extremely small GTR particle size, e.g., on the order of 140 mesh or smaller and/or through continuous mixing of the composition. Both of these methods are extremely expensive however, and even finely ground GTR tends to settle, particularly at elevated temperatures. Other approaches have utilized additional additives, such as inorganic or organic acids, but these methods also increase expense and often require yet more additives to counteract undesirable caustic action of the acids on containers and other components of the asphalt composition.

What are needed in the art are additives for rubber-modified asphalt that can improve storage stability of the rubber-modified asphalt. Additives that can also improve other physical characteristics of the modified asphalt, such as elasticity, would be of great benefit. Particularly desirable additives include those that do not introduce undesirable qualities such as causticity to the rubber-modified asphalt.

SUMMARY

According to one embodiment, disclosed is an asphalt modifier package that includes GTR, an amine functionalized wax, and an elastomeric polymer. Beneficially, the GTR need not have a particularly small particle size. For instance, in some embodiments, the GTR of the asphalt modifier package can include some larger particles, for instance can include particles that are retained on a screen having mesh opening of about 400 microns in an amount of up to about 10 wt. %, i.e., about 10 wt. % or less. The amine functionalized wax can include a natural wax, for instance a plant-based wax. The elastomeric polymer can include a reactive elastomeric terpolymer (RET), for instance an RET that includes epoxide functionality and/or can include styrene-butadiene copolymers such as styrene butadiene styrene block copolymers, styrene butadiene random copolymers, and mixtures thereof. The asphalt modifier package can also include other asphalt modifiers, such as polyolefin-based modifiers.

According to one embodiment, disclosed is an asphalt modifier package in the form of particles. More specifically, the asphalt modifier particles can include GTR and an RET that have been compounded together and processed so as to be in the form of particles including the GTR and the RET intimately mixed together. Beneficially, such asphalt modifier particles can be free of other reactive modifiers, such as certain other co-reactants.

Also disclosed are rubber-modified asphalts that include a modifier package as described. In one embodiment, the modifier package can include GTR, an amine functionalized wax, and an elastomeric polymer. Rubber-modified asphalts that incorporate disclosed modifier packages can exhibit an excellent storage stability, as well as other desirable properties, and can do so at a low modifier add-in level. For instance, a rubber-modified asphalt can include a modifier package as described at an add-in level of about 10 wt. % or less. A rubber-modified asphalt as disclosed herein can have a storage stability separation value of less than about 6° F. A rubber-modified asphalt as disclosed can exhibit a multiple stress recovery creep (MSCR) non-recoverable creep compliance ($J_{nr}$) value at 3.2 kPa at 67° C. of from about 0.05 to about 2 and/or a MSCR percent recovery at 3.2 kPa at 67° C. of from about 20% to about 75%.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION

Figure 1:
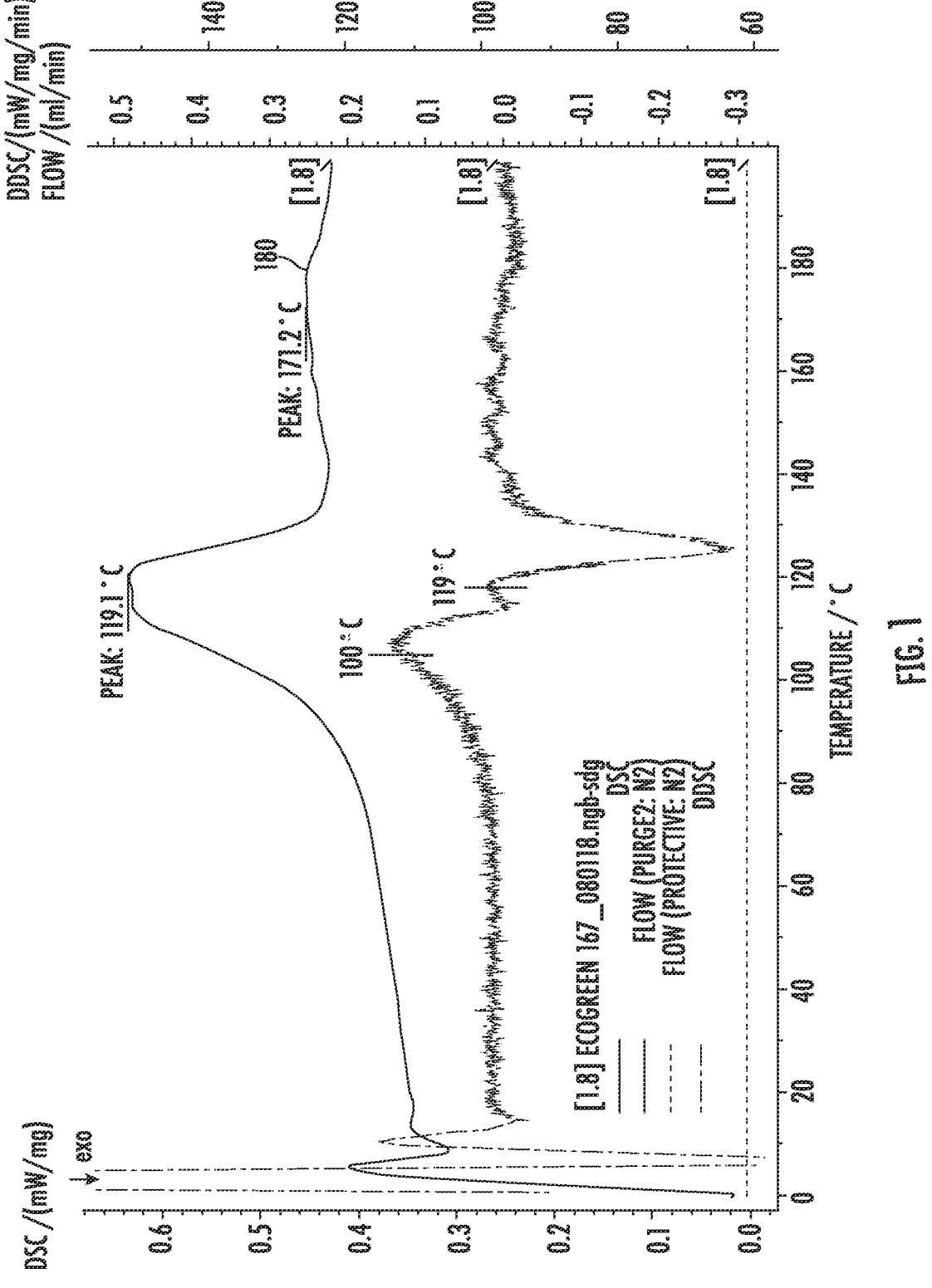
FIG. 1 provides differential scanning calorimetry (DSC) data for an amine functionalized wax as may be incorporated in an asphalt package as described herein.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are modifier packages for use in rubber-modified asphalts. As utilized herein, the term "modifier package" refers to a group of agents that can be added to an asphalt, each of which provides some desirable function or characteristic to an asphalt binder. The term is not intended to refer only to a single composition that includes a plurality of modifiers mixed together prior to combination with an asphalt binder. While two or more components of a modifier package can be combined together to form a modifier composition prior to addition of the composition to an asphalt, this is not a requirement of all embodiments of disclosed modifier packages. In some embodiments, one, some, or all components of an asphalt modifier package can be added singularly to an asphalt. An asphalt package can include a plurality of modifiers in which a combination of singular addition and combined addition to an asphalt is encompassed. For instance, in some embodiments as discussed further herein, an asphalt modifier package can include particles that include at least certain of the modifiers compounded together in a single composition prior to addition of the modifier composition to an asphalt.

Rubber-modified asphalts encompassed herein can include any type of asphalt for use in any suitable application. For instance, disclosed modifiers can be utilized with natural asphalts or refined asphalts, as well as combinations thereof. In addition, disclosed modifiers can be utilized with blown asphalt (also referred to as oxidized or air-refined asphalt) or straight asphalt. The modifiers may be useful in formation of either hot mix or warm mix asphalt. In one particular embodiment, disclosed modifiers can find application in paving applications with either hot mix or warm mix straight asphalt, but it should be understood that the modifiers are in no way limited to such applications, and in other embodiments, the modifiers can be highly beneficial in forming rubber-modified asphalts for other applications such as roofing applications.

Disclosed modifiers can improve storage stability of rubber-modified asphalts and can prevent particle settling issues that have prevented wider use of these materials. For instance, a rubber-modified asphalt that incorporates disclosed modifiers can exhibit a storage stability separation value of about 6° F. or less, or even lower in some embodiments, for instance about 4° F. or less. Stability of GTR-modified asphalts can be determined by the separation test in which samples can be prepared according to ASTM D 7173 "Determining Separation Tendency of Polymer from Polymer Modified Asphalt" (also known as the 'cigar tube test'). According to the method, the softening point can be measured according to ASTM D36 "Standard Test Method for Softening Point of Bitumen." The storage stability separation value describes the difference in softening point temperatures between the top and bottom of the testing tube. The smaller the difference in the softening point temperatures between the top and the bottom of the testing tube, the higher the stability of the asphalt.

Asphalts that incorporate disclosed modifiers can exhibit excellent physical characteristics in addition to being highly stable during storage. Moreover, disclosed rubber-modified asphalts can exhibit excellent physical characteristics at a low add-in level, for instance at an add-in level of the entire modifier package of about 10 wt. % or less in some embodiments.

The physical characteristics of the disclosed modifiers and asphalt binders that incorporate the modifiers can be characterized in one embodiment according to the "Multiple Stress Creep Recovery" (MSCR) testing methodology, which is a prominent and widely used specification that can be used to accurately indicate the resistance of an asphalt binder to plastic deformation over repeated stress cycles. This characteristic is indicative of rutting performance and is very important relative to pavement longevity. Beneficially, the MSCR methodology can provide information on both performance and formulation of the asphalt binder. In the MSCR test, high levels of stress and strain are applied to the binder, which can better represent what occurs in an actual pavement. By using the high levels of stress and strain in the MSCR test, the response of the asphalt binder captures not only the stiffening effects of the polymer, but also the delayed elastic effects. The MSCR test provides high temperature grade and quality of polymer modification. The compliance value ($J_{nr}$) from the MSCR test provides rut resistance information and the amount of recovered strain from the test identifies the presence of polymer and also the quality of the blending of the polymer in the binder. The MSCR has been used to test and successfully rank heat, SBS, SB, Elvaloy® (reactive terpolymer), GTR, latex, and chemically modified asphalt binders. The same test procedure can also be used to evaluate the presence of polymer modification in the binder eliminating the need to run other time consuming, less discriminating test methods.

In one embodiment, rubber-modified asphalts described herein can exhibit an MSCR $J_{nr}$ value at 3.2 kPa and 67° C. of from about 0.05 to about 2, e.g., from about 0.1 to about 1, from about 0.2 to about 0.7, or less than about 0.5 in some embodiments. Rubber-modified asphalts as described can exhibit an MSCR percent recovery at 67° C. of from about 20% to about 75%, for instance from about 25% to about 55%, from about 27% to about 51%, or greater than about 35% in some embodiments. MSCR values can be obtained according to standard methodology, for instance as described in AASHTO M 332-18.

Beneficially, disclosed rubber-modified asphalts can exhibit excellent storage capabilities without loss of other desirable qualities. For instance, the rubber-modified asphalts can exhibit a rotational viscosity at 135° C. of from about 2,000 centipoise (cp) to about 5,000 cp, for instance from about 2,300 cp to about 4,800 cp in some embodiments as determined according to AASHTO T 316. In some embodiments, the rubber-modified asphalts can exhibit a dynamic shear rheometer phase angle of less than about 75° C., less than about 73° C., or less than about 70° C. as determined by rolling thin film oven (RTFO) residue testing at 76° C. as determined according to AASHTO T 315).

Disclosed modifiers can provide a rubber-modified asphalt for any application, and in particular, paving and roofing applications, that meet a target PG in terms of binder stiffness (e.g., as measured by the dynamic shear rheometer or softening point) and low temperature flexibility (e.g., as measured by Bending Beam Rheometer or Fraass Breaking Point or Mandrel Bending Test).

Such desirable qualities are achieved in the rubber-modified asphalts in one embodiment through incorporation of an amine functionalized wax in conjunction with other modifying agents. As utilized herein, the term "wax" is intended to refer to a lipophilic polymer having a melting point of about 105° F. (40° C.) or higher, for instance from about 150° F. (66° C.) to about 266° F. (130° C.) in some embodiments and including a hydrocarbon chain of about nine carbons (C9) or greater.

In one embodiment, an amine functionalized wax as may be incorporated in the asphalt modifier package can exhibit a DSC peak of about 0.6 mW/mg between about 110° C. and about 130° C., e.g., about 120° C. Moreover, an amine functionalized wax can exhibit a secondary DSC peak, generally between about 160° C. and about 180° C., for instance at about 170° C.

An amine functionalized wax as may be incorporated in a rubber-modified asphalt can optionally be characterized according to Fourier-transform infrared spectroscopy (FTIR). In one embodiment, an amine functionalized wax encompassed herein can exhibit one or more FTIR absorbance peaks that are indicative of amine functionality at approximately 3298 cm$^{-1}$, 1732 cm$^{-1}$, 1638 cm$^{-1}$, 1556 cm$^{-1}$, or 1244 cm$^{-1}$.

While the amine functionalized wax modifiers can be based upon either synthetic or natural waxes, in certain embodiments disclosed amine functionalized wax modifiers can be based upon natural waxes, and in one particular embodiment, can be based upon one or more plant waxes. Natural waxes encompassed herein can include wax esters (i.e., including an ester group on the hydrocarbon chain) and/or other functional groups on/in the hydrocarbon chain. In one embodiment, a natural wax can include unsaturated bonds along the alkyl chain and may optionally include one or more additional functional groups such as fatty acids, primary and secondary alcohols, ketones, aldehydes, and combinations thereof (e.g., fatty acid esters). Natural waxes can generally be differentiated from synthetic waxes (e.g., petroleum-derived waxes) through the inclusion of unsaturated bonds and/or additional functionality on/within the hydrocarbon chain, whereas synthetic waxes generally consist of long-chain homologous aliphatic hydrocarbons.

The wax modifiers can incorporate amine functionality on/within an alkyl chain of the wax. For instance, the amine functionality can have the following general structure:

$$-NR_1R_2$$

in which — represents a bond between the amine functionality and a hydrocarbon chain of the wax and R$_1$ and R$_2$ can be the same or different from one another and are independently selected from hydrogen, C1 to C12 alkyl, and can optionally be interconnected to form a ring structure. The amine-functionalized wax modifiers disclosed herein are differentiated from amide waxes, which incorporate an amide bond along the alkyl chain as opposed to amine functionality as is included in disclosed wax modifiers. However, disclosed amine functionalized waxes can encompass amide waxes that also include an amine functionality as described.

Amine functionalized waxes as may be utilized as asphalt modifiers can be obtained in the retail market. For instance, amine functionalized natural waxes available from Asphalt & Wax Innovation, LLC and Green Asphalt Technologies, LLC (e.g., EcoGreen™ 167) can be utilized in one embodiment.

Amine functionalized wax modifiers can be formed according to known organic chemistry formation methods. For instance, a wax, e.g., a natural wax including one or more unsaturated bonds on the alkyl chain, can be reacted with an alkyl phosphite to form an adduct thereof containing carbon-to-phosphorus bonds. This adduct product can then be reacted with an amine that includes at least one reacting hydrogen, e.g., having a structure HNR$_1$R$_2$ with R$_1$ and R$_2$ as defined above, to form an amine functionalized wax as may be incorporated in an asphalt modifier composition.

A modifier package can generally include the amine functionalized wax component (i.e., either a single or multiple amine functionalized waxes) in an amount of up to about 10.0 wt. % by weight of the modifier package, for instance, from about 0.01 wt. % to about 5 wt. %, from about 0.05 wt. % to about 3 wt. %, or from about 0.1 wt. % to about 2.0 wt. % in some embodiments.

A modifier package for a rubber-modified asphalt can include an elastomeric polymer. As utilized herein, the term "elastomeric polymer" is intended to refer to a polymer that exhibits viscoelasticity (i.e., exhibits resistance to deformation and a tendency to return to an original state following removal of stress) and weak intermolecular forces. An elastomeric polymer generally has a relatively low Young's modulus and a Poisson's ratio between −1.0 and 0.5 (for instance, as determined according to ASTM E132), and can exhibit a break at elongation of 100% or greater, for instance from about 100% to about 800% in some embodiments (for instance, as determined according to ASTM D412). Examples of elastomeric polymers can include, without limitation, rubbers (e.g., natural rubber, polyisoprenes, polybutadienes, styrene-butadiene rubber, butyl rubber, nitrile rubber, epichlorohydrin rubber, ethylene-propylene rubber, ethylene-propylene-diene rubber, polychloroprene, polyacrylate rubber, fluorocarbon rubbers, silicon rubbers, polysulfide rubbers, ethylene-vinyl acetate copolymer, propylene oxide rubbers, polypropylene oxide-allyl glycidyl ether copolymer, chlorinated polyethylene, chlorosulfonated polyethylene); as well as thermoplastic elastomers (e.g., styrenic thermoplastic elastomers, elastomeric alloys such as thermoplastic olefin elastomers and thermoplastic vulcanizates, thermoplastic urethane elastomers, thermoplastic polyester-ether elastomers, thermoplastic polyamide elastomers; as well as blends of elastomeric polymers. In one embodiment, an elastomeric polymer can include copolymers of ethylene and alkyl acrylates. For example, alkyl acrylates that are esters of acrylic acid and C1 to C10 alcohols utilized as comonomers. Exemplary comonomers can include, without limitation, alkyl acrylates such as n-butyl acrylate, ethyl acrylate, and methyl acrylate, which can be copolymerized with ethylene to provide suitable ethylene alkyl acrylate copolymers.

In one embodiment, an elastomeric polymer can include a reactive elastomeric terpolymer (RET) that includes an elastomeric backbone formed of three different monomer units and carries a reactive functionality that is capable of reaction with another component of as asphalt binder. The monomer units of the elastomeric terpolymer can be random, block, or some combination thereof along the polymer backbone. The reactive functionality can include, without limitation, hydroxyl, epoxide, amine, mercapto, or vinyl (e.g., a pendant vinyl group). Other binder components within an asphalt binder that may exhibit reactivity to a RET can include the asphalt and/or other modifiers of a binder. For instance, a RET can exhibit reactivity to an asphaltene component of an asphalt and/or to a component of a GTR modifier (e.g., carbon black or the like of a GTR modifier), as well as with one or more additional components of a modified asphalt (e.g., a co-reactant, a wax, or the like). In one particular embodiment, a RET can include epoxide functionality, e.g., glycidyl or glycidyl acrylate functionality. Elastomeric polymers including epoxide functionality can include those derived from bisphenols, non-limiting examples of which include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z. A non-limiting example of epoxide functional RET includes alkylene-alkylacrylate-glycidyl acrylate terpolymers such as ethylene-butyl acrylate-glycidyl methacrylate terpolymers (e.g., EnBAGMA), commercial examples of which are available under the trade name of Elvaloy® terpolymers (e.g., Elvaloy® 5170, Elvaloy® 4170, etc.).

Elastomeric polymers as may be included in an asphalt modifier package can include styrene-based elastomeric polymers such as styrene butadiene copolymers. Examples of styrene-based elastomeric polymers include, without limitation, styrene butadiene block copolymer (SB), styrene ethylene butylene styrene (SEBS), styrene-butadiene rubbers (SBR), styrene butadiene styrene (SBS) block copolymers, SBS random copolymers and mixtures thereof. SBS block copolymers and SB random copolymers are commercially available. The butadiene (B) segment can be a polymerized conjugated diene having 4-6 carbons atoms such as, without limitation, 1,3-butadiene, isoprene, 2-ethyl-1,3-butadiene, 2,3-dimethyl-1,3-butadiene and piperylene. The styrene (S) segment can be a monovinyl aromatic polysegment such as, for example, polystyrene, α-methylstyrene, p-vinyltoluene, m-vinyltoluene, o-vinyltoluene, 4-ethylstyrene, 3-ethylstyrene, 2-ethylstyrene, 4-tert-butylstyrene and 2,4-dimethylstyrene. SBS copolymers as may be included in an asphalt modifier composition are available commercially from, e.g., Kraton Polymers LLC, Polimeri Europa, and BASF Corporation.

Without wishing to be bound to any particular theory, it is believed that the presence of the amine functionalized wax can encourage interaction between an elastomeric polymer, the GTR particles, and one or more components of the asphalt, e.g., the functionalized asphaltene polar fraction of asphalt, preventing settling of the GTR in the asphalt composition.

A modifier package can generally include the elastomeric polymer component in an amount of up to about 20.0 wt. % by weight of the modifier package, for instance, from about 0.01 wt. % to about 10 wt. %, from about 0.05 wt. % to about 5 wt. %, or from about 0.1 wt. % to about 2.0 wt. % in some embodiments.

GTR as may be incorporated in the rubber-modified asphalt can encompass any GTR as is generally known in the art. In particular, it should be understood that reference to GTR refers to any source of rubber crumb; it is not intended to be limited to only that material sourced to recycled tires but refers to crumb rubber of any source.

In one embodiment, the GTR component can include particles having a relatively large particle size designation, as such GTR can be more economically feasible, but this is not a requirement of the GTR additive of the rubber-modified asphalts. As utilized herein, the term "particle size designation" refers to a particulate additive that includes individual particles within a defined size range. Particle size designation can be determined according to ASTM D5603 as is known in the art. By way of demonstration, a particulate additive that includes a majority (e.g., about 90 wt. % or more, about 95 wt. % or more, about 96 wt. % or more, about 97 wt. % or more, about 98 wt. % or more, or about 99 wt. % or more by weight of the additive) of particles having a large particle size designation will include a high proportion of large particles, whereas a particulate additive that includes a majority of particles having a small particle size designation will include a high proportion of small particles.

A GTR additive can include either or both of coarse particulates and fine powder particulates. A coarse particulate additive is generally considered to be a particulate in which a majority of the particles have a particle size designation of 40 mesh or larger (i.e., mesh numbers of 40 or less), whereas a fine powder is generally considered to be a particulate in which a majority of the particles have a particle size designation of smaller than 40 mesh (i.e., mesh numbers larger than 40). Per ASTM D5603, a particle size designation of 40 mesh indicates that no particles of the particulate being tested according to the procedure will be retained on a 30 mesh screen (having openings of 595 micrometers) and that no more than 10 wt. % of the particles will be retained on a 40 mesh screen (having openings of 425 micrometers). In addition, at least a nominal amount of particles will be retained on a 40 mesh screen in order for the particulate to be determined to have a particle size designation of 40 mesh.

In one embodiment, about 90 wt. % or more of the GTR additive can have a particle size designation of 140 mesh or larger (i.e., mesh numbers of 140 or less, indicating larger particles). Per ASTM D5603, a particle size designation of 140 mesh indicates that all of the particles having the designation can pass through a 120 mesh screen (128 micrometer openings) and no more than 10 wt. % of the particles having the particle size designation will be retained on a 140 mesh screen (106 micrometer openings). Accordingly, a portion of the GTR additive can include particles larger than about 100 microns in size. For instance, from about 10 wt. % or more of the GTR additive can have a particle size of about 100 microns or larger (i.e., be retained on a screen having mesh openings of about 100 microns).

Moreover, it should be reiterated that a GTR additive is not limited to only particles falling within an indicated particle size designation (e.g., 140 mesh), and the additive can include an amount of particles (e.g., about 10 wt. % or less for those embodiments in which a single particle size designation is utilized to describe the additive) falling outside of a particle size designation. For instance, about 10 wt. % or less, about 5 wt. % or less, about 4 wt. % or less, about 3 wt. % or less, about 2 wt. % or less, or about 1 wt. % or less of the additive can have a particle size that would be retained on the screen size of a single particle size designation, e.g., a 140 mesh screen (105 micron openings) in the example of a 140 mesh particle size designation. For instance, from about 1 wt. % to about 10 wt. % of a GTR additive can have a particle size of about 100 microns or larger.

The GTR additive can include particles of any particle size designation and any suitable grade designation as known in the art (examples of which are described in ASTM D5603), as well as combinations of GTR materials. For instance, about 90 wt. % or more of the GTR additive can have a designated mesh size of 10 mesh, 20 mesh, 30 mesh, 40 mesh, 50 mesh, 60 mesh, 70 mesh, 80 mesh, 100 mesh, 120 mesh, 140 mesh, 170 mesh, or 200 mesh, or smaller.

A GTR additive can also include one or a combination of grade designations. By way of example, a GTR additive can include 90 wt. % or more of the additive comprised of a combination of a first particulate having a first grade designation (e.g., Grade 1, which includes whole tire recycled vulcanizate particulate rubber prepared from passenger car, truck, and bus tires from which the fiber and metal have been removed), this particulate having a first particle size designation (e.g., 140 mesh); and a second particulate having a second grade designation (e.g., Grade 2, which includes car, truck, and bus recycled vulcanizate particulate rubber that is prepared from car, bus, and truck tread only), this particulate having a second particle size designation (e.g., 100 mesh). Of course, mixtures of more than two particulate GTR components are also encompassed herein in forming a GTR additive component for a modifier package, as well as mixtures of different grades having the same particle size designation and different particles size designation components of the same grade.

As indicated previously, the additive can include an amount (e.g., about 10 wt. % or less, about 5 wt. % or less, about 4 wt. % or less, about 3 wt. % or less, about 2 wt. % or less or about 1 wt. % or less in some embodiments) GTR particles larger than the mesh size of a particular particles size designation(s) of a component of the GTR additive, e.g., larger than about 400 microns in average particle size. In general, however, less than about 1 wt. % of a GTR additive can be about 0.6 mm or larger in average cross-sectional size, as larger particles can detract from physical characteristics of the asphalt. Similarly, there is no particular lower limit to the size of individual particles included in a GTR additive, and the additive can include an amount of extremely small particles, e.g., rubber fines, in some embodiments. Practically, however, and due to economic realities, the GTR additive can, in most embodiments, include about 90 wt. % or more of the additive comprised of a particulate have a designated mesh size of from 30 mesh to 140 mesh, as too great an add-in level of large particles can lead to undesirable characteristics of the modified asphalt and smaller particle size designations are expensive to produce. For instance, about 10 wt. % or less of the GTR additive can be larger than about 500 microns (i.e., retained on a screen having mesh of 500 micron openings), larger than about 400 microns, larger than about 300 microns, larger than about 200 microns, or larger than about 100 microns, and about 1 wt. % or less of the GTR additive can be larger than about 600 microns in particle size (i.e., retained on a screen having mesh of 600 micron openings).

In one embodiment, the GTR additive can include a particulate having a particle size designation of about 80 mesh or smaller, e.g., 80 mesh, 100 mesh, 120 mesh, 140 mesh, 170 mesh, 200 mesh, or smaller. Such small particulates are generally referred to as micronized rubber powders (MRP). In some embodiments, a GTR additive can include an MRP additive in combination with a GTR component having a larger particle size designation. For instance, as indicated above, a GTR additive can include a first portion formed of an MRP in combination with a second portion having a larger particle size designation (optionally formed of a different grade designation) and can also include a third portion (e.g., about 10 wt. % or less) of larger particles. Of course, additional portions exhibiting different particle size designations can also be included in a GTR additive.

Accordingly, the particle size distribution of the GTR additive can be narrow, quite broad or even multi-modal. Particle size distribution of a GTR additive can be determined according to ASTM D5644, e.g., ASTM D5644-18, as is known in the art. For instance, in one embodiment, a GTR additive can have a particle size distribution as determined according to ASTM D6544-01 in which less than 1 wt. % of the particles are retained on a 600 micrometer sieve and less than 10 wt. % of the particles are retained on a 400 micrometer sieve. Such GTR additives are available in the art, for instance from Lehigh Technologies (e.g., Micro-Dyne™ additives, such as MicroDyne™ 400).

The reclaimed elastomeric polymers used as the raw material for forming the GTR, such as scrap tire rubber, can be cured (previously vulcanized) rubbers. They accordingly can be relatively inert particles which are essentially non-reactive with other components of the modified asphalt. However, as indicated previously, the inclusion of the amine functionalized wax in the modified asphalt improves settling of the GTR particles, and as such, some interaction between the particles and one or more other components of the asphalt binder is understood to be taking place due to the presence of the amine functionalized wax. Beneficially, however, there is no requirement for the GTR to be subjected to a devulcanization process prior to inclusion in the modified asphalt.

In one embodiment, the GTR can be formed utilizing the cryogenic grinding system described in U.S. Pat. No. 7,445, 170 and an impact mill as described in U.S. Pat. No. 7,861,958. The teachings of U.S. Pat. Nos. 7,445,170 and 7,861,958 are incorporated herein for purposes of describing useful techniques and equipment which can be employed in making GTR that can be utilized as an asphalt modifier. However, the GTR is not limited to cryogenically ground GTR and can optionally be formed according to other methods such as, but not limited to, a wet grinding process, ambient temperature grinding procedures, and other cryogenic processes. In any case, the GTR can typically include a mixture of various cured rubbery polymers including natural rubber, synthetic polyisoprene rubber, emulsion styrene-butadiene rubber, solution styrene-butadiene rubber, and a wide variety of additional cured rubbers.

A modifier package can generally include the GTR component in an amount up to about 95 wt. % of the modifier package, for instance from about 0.5 wt. % to about 80 wt. %, from about 1 wt. % to about 70 wt. %, or from about from about 2.0% to about 25% in some embodiments.

In one embodiment, a modifier package can include the GTR and a RET compounded together as a single modifier composition. In this embodiment, prior to combination with an asphalt binder, at least the GTR component and the RET component of the asphalt modifier package can be compounded together and processed to form particles that include the GTR and the RET intimately mixed together. In this particular embodiment, the inclusion of an amine functionalized wax in the asphalt modifier package (either as a component of the GTR/RET modifier composition or separately therefrom) can be optional.

Surprisingly, pre-mixing a GTR additive with an RET additive has been found to improve the storage stability of a rubber-modified asphalt. For instance, a rubber-modified asphalt that is formed through combination of an asphalt binder with an asphalt modifier package in which a GTR and an RET have been previously combined at elevated temperature can exhibit a storage stability separation value of about 6° F. or less, or even lower in some embodiments, for instance about 4° F. or less as determined by ASTM D 7173. Moreover, this effect can be obtained even without the inclusion of an amine functionalized wax in the GTR/RET modifier composition. Without wishing to be limited to any particular theory, it is believed that compounding GTR and an RET together so as to form an intimate mixture of the modifiers prior to addition of the modifiers to an asphalt binder can encourage interaction between the two modifiers and can initiate a reaction between the two, e.g., reaction between the RET and a component of the GTR (carbon black, a rubber of the GTR, etc.). However, it is also understood that complete reaction is not carried out in the pre-mixed modifier composition, and desirably, at least some reactivity of the modifiers remains in the compounded modifier composition prior to combination with an asphalt binder. As such, upon combination of the GTR/RET modifier composition to the asphalt binder, the composition can still exhibit reactivity with the asphalt binder. To encourage the desired interaction between the GTR and RET without excessive reaction of the modifiers prior to addition to the asphalt binder, the GTR/RET modifier composition can be free of other reactive modifiers (e.g., co-reactants as discussed further herein). However, the lack of other reactive modifiers in the GTR/RET modifier composition does not preclude the presence of other reactive modifiers in the asphalt modifier package. In this embodiment, other reactive modifiers to be incorporated in a modifier package can be added to the asphalt binder separately from the GTR/RET modifier composition, i.e., either at the same time or a different time, but not as a component of the compounded GTR/RET composition.

To form the GTR/RET composition, at least these two modifier components can be combined together at conditions suitable to encourage intimate mixture of the two. For instance, a mixture including the GTR and the RET can be formed at a temperature above the melting point of the RET, for instance in an extruder with a mixing zone at a temperature of about 120° C. or greater, for instance from about 140° C. to about 200° C. The GTR and the RET can be added to the extruder in any order, e.g., sequentially melting one and then melting the other and then mixing; sequentially melting one and then mixing with the other unmelted and then melting the mixture; simultaneously apart and then mixing; simultaneously together; or any other suitable order/arrangement. A solid form of the modifier composition, non-limiting examples of which include particles, pellets, pills, beads, granules, or the like may be formed by any suitable method with any suitable apparatus including extrusion, pelletizing, cutting, chopping and the like. In one embodiment, the particle size of the modifier composition can be about 1 mm or larger, for instance 3 mm. Any suitable pelletizing/micronizing method and apparatus may be utilized to form a particulate modifier or modifier composition, examples of which are further described herein.

Other polymeric asphalt modifiers as are known in the art can be incorporated in the rubber-modified asphalts. In one embodiment, a rubber-modified asphalt can include a polyolefin-based modifier, for instance a polyolefin homo-polymer or copolymer or a combination thereof. In some non-limiting embodiments, a polyolefin homopolymer or copolymer can be a poly α-olefin ("PAO"), which may be formed from polymerizing a single monomer (in the case of homopolymer) or 2 or more different monomers (in the case of copolymer). In general, monomer units of a PAO can include C2 to C36 α-olefins (i.e., α-olefins having from 2 to 36 carbon atoms). The particular characteristics of a polyolefin additive are not particularly limited; for instance, a polyolefin additive can have any suitable melt flow index. By way of example, a polypropylene polymer additive can have a melt flow index as determined at 230° C. of from about 5 to about 60, from about 10 to about 40, or from about 20 to about 30, e.g., about 25, in some embodiments.

Alternatively, a PAO modifier may be formed by blending 2 or more previously formed PAO's, by copolymerizing 2 or more different PAO's, by copolymerizing 2 or more different α-olefins, or any combination of the foregoing. In non-limiting examples, such polyolefin modifiers may include polyethylene ("PE") homopolymer, polypropylene ("PP") homopolymer and polypropylene/polyethylene ("PP/PE") copolymers. In some embodiments, polyolefin-based modifiers (either homopolymers or copolymers) can have a number average molecular weight of from about 20,000 to about 200,000.

Polyolefin polymers may be obtained by any suitable method and means, using any suitable catalyst as is well known in the polyolefin art. As a non-limiting example, PP homopolymer and PP/PE copolymer may be derived from the manufacture of PP resins either as a by-product stream(s) or as intermediate grades during the changeover form one grade to the next. These streams may be collected from a process and segregated into several qualities that may be recombined to yield a product polymer that is suitable for asphalt applications. In one embodiment, a polyolefin polymer additive can be a recycled polymer, for instance recycled polypropylene additive. Polyolefin additives can also be obtained on the retail market, as is known. By way of example, polypropylene/polyethylene copolymers as may be incorporated in an asphalt modifier package include those available from the ExxonMobil Corporation under the Vistamaxx™ tradename, e.g., 6502, 6202, 6102, etc.

When included, a modifier package can generally include a polyolefin-based modifier component in an amount of up to about 20.0 wt. % by weight of the modifier package, for instance, from about 0.01 wt. % to about 10 wt. %, from about 0.05 wt. % to about 3 wt. %, or from about 0.1 wt. % to about 2.0 wt. % in some embodiments.

Other modifiers as are known in the art may optionally be incorporated in a modified asphalt. By way of example, other wax modifiers such as polyethylene waxes, Fischer-Tropsch waxes, petroleum paraffin waxes, Montan wax (also known as lignite wax or OP wax), natural or synthetic latex, crude tall oil, oxidized tall oil pitch, Trinidad Lake Asphalt, Gilsonite® and other natural asphalts, etc., or combinations thereof can be incorporated in a modifier package. As a non-limiting example, a polyethylene ("PE") wax having a number average molecular weight in the range of about 650-2500, although a PE wax having a number average molecular weight greater or less than that range may also be suitable. As another non-limiting example, a Fischer-Tropsch wax having a number average molecular weight in the range of about 450-1200, although a Fischer-Tropsch wax having a number average molecular weight greater or less than that range may also be suitable.

Other waxes (in addition to an amine functionalized wax as discussed previously) as may be incorporated in a rubber-modified asphalt can include petroleum waxes derived from crude oil refining processes. One non-limiting example of a petroleum wax modifier can have a melting point in the range of about 150° F. (66° C.) to about 220° F. (104° C.). For example, petroleum micro-waxes (also referred to as microcrystalline waxes), which are produced by de-oiling petrolatum as part of the petroleum refining process, can be included in a modifier package. A micro-wax can serve a dual purpose of viscosity modifier as well as to impart low temperature performance flexibility to the modified asphalt.

Microcrystalline waxes can be described by a number of ASTM specifications. These include congeal point (ASTM D938), needle penetration (D1321), color (ASTM D6045), and viscosity (ASTM D445). Microcrystalline waxes can generally be put into two categories: "laminating" grades and "hardening" grades. Laminating grades as may be incorporated in an asphalt modifier package can, in one embodiment, have a melt point of 140-175° F. and needle penetration of 25 or above. Hardening grades as may be incorporated in an asphalt modifier package can, in one embodiment, have a melting point that can range from about 175-200° F. and can have a needle penetration of 25 or below. Color in both grades can range from brown to white, depending on the degree of processing done at the refinery level.

A non-limiting example of a suitable crude oil-derived micro-wax as may be included in a rubber-modified asphalt as disclosed herein may have the following properties: drop melt point (ASTM D 127) in the range of 150° F. (66° C.) to 220° F. (104° C.); and Kinematic Viscosity (ASTM D445) at 212° F. (100° C.) in the range 10 to 320 centistokes.

Other waxes as may be included in a modifier package can include polyethylene by-product waxes (also referred to as "polyethylene waxes" or "PE waxes") or petroleum paraffin waxes. For instance, PE waxes having a melt temperature range of from about 100° C. to about 160° C. can be included. By-product PE wax can be incorporated for use as a dispersant for the elastomeric polymer, as well as a viscosity modifier. Polyethylene waxes as are known and available in the market can be incorporated in a modifier package such as, by way of a non-limiting example, alpha wax by, e.g., alpha wax CWP500 polyethylene wax as well as other waxes available from Trecora™ Chemical and the like. Fischer-Tropsch hard wax having a melting temperature in the range of from about 70° C. to about 115° C. is another example of a secondary wax as may be included in a rubber-modified asphalt.

When included, the content of a secondary wax in a modifier package can be in the range of about 2 wt. % or greater, for instance from about 1 wt. % to about 20 wt. %, from about 2 wt. % to about 15 wt. %, or from about 4 wt. % to about 10 wt. %, in some embodiments.

Tall oil materials such as crude tall oil and oxidized tall oil pitch are additional examples of modifying agents as may be utilized. As a non-limiting example, when included, a tall oil component can be included in a modifier package in a range of about 2 wt. % to about 20 wt. %, for instance from about 2 wt. % to about 10 wt. % in some embodiments. As used herein, the term "tall oil materials" includes synthetic and naturally occurring tall oil, tall oil pitch, tall oil blends, and similar tall oil products. Such additives may function as a surfactant in a modifier package and are available in the art, for instance, from the Ingevity Company (e.g., Ingevity® PC-2014).

Tall oil is a liquid resinous material that may be obtained in the digestion of wood pulp from paper manufacture. A common source of tall oil is from pine trees. Commercial tall oils comprise a complex of fatty acids, resin acids, sterols, higher alcohols, waxes and hydrocarbons. The acid components also may be present as the esters thereof. Tall oil is commonly obtained when wood is converted to paper pulp by the sulfide or Kraft process. A non-limiting example of an oxidized tall oil pitch as may be included in a modified asphalt may have the following properties: Softening point in the range of 125° F. (52° C.) to 220° F. (104° C.); and needle penetration value at 25° C. in the range of 2 to 40, for instance in the range of 5 to 20.

Another optional modifier can include a sulfur source such as elemental sulfur, a sulfur donor, a sulfur byproduct, or combinations of two or more thereof. A sulfur donor is a compound that can generate sulfur in-situ when included in the modified asphalt. Examples of sulfur donors include sodium diethyldithiocarbamate, 2,2-dithiobis(benzothiazole), mercaptobenzothiazole, dipentamethylenethiuram tetrasulfide, or combinations of two or more thereof and include Sasolink® TXS (a proprietary product available from Sasol Wax Americas, Shelton, Conn., USA). A sulfur byproduct can include one or more sulfides, sulfoxides, sulfones, or combinations of two or more thereof.

Another optional modifier is a co-reactant that provide increased reaction rates for one or more reactions between components of the rubber-modified asphalt. Examples of co-reactants include, without limitation, tri-mellitic anhydride (TMA) and/or polyphosphoric acid (PPA), which can be incorporated in a modifier package in standard amounts. Polymeric processing aids as are known in the art may also be included in a modifier package, e.g., processing aids as are available from the Struktol Company of America, e.g., Struktol® TR 016 and the like.

The individual components of a modifier package can be combined with an asphalt according to any suitable methodology. For instance, the GTR can be combined with an asphalt as a singular component, and one or more other modifiers of a modifier package, e.g., an amine functionalized wax and an elastomeric polymer, optionally with one or more other polymeric modifiers, can be provided together as a pre-formed modifier composition, for instance in a solid form as a single pack additive in pastille, bead, pill, or granule form. For example, the amine functional wax component, the elastomeric polymer component, and any other optional polymeric components (e.g., a PAO) can be melted together and granulized for addition to an asphalt prior to, contemporaneously, or following addition of a GTR to the asphalt.

As a non-limiting example, an amine functionalized wax component and an elastomeric polymer component may both be melted and then thoroughly mixed together before being reformed into particles which may then be added to an asphalt. The melting may be accomplished individually with the previously melted materials added together, or may be accomplished simultaneously with the unmelted materials contacted together and then melted, or may be accomplished sequentially with a first material melted then combined with an unmelted material and then further melting of both. Moreover, one or more of the components can be melted either prior to or upon combination with an asphalt. Such methods can incorporate a third component in a melted mixture at any point in the process formation, with addition of the third component being in the melted or unmelted form. As a non-limiting example, polyolefin polymer particles may be mixed into the melted combination of the amine functionalized wax and the elastomeric polymer with this mixture then formed into particles which may then be added to an asphalt. As even another non-limiting example, a dry mix of amine functionalized wax particles and elastomeric polymer particles may first be formed, and this mix added directly to the asphalt, or the dry mix may then be melted and formed into particles which may then be added to the asphalt, or the particles may be melted and added to the asphalt in the melted form. In yet another embodiment, GTR particles may be mixed together with a melted RET and this mixture then formed into particles that may then be added to an asphalt.

A modifier composition, e.g., a combination of an amine functionalized wax and/or an elastomeric polymer and/or a polyolefin polymer may be formed into particles utilizing any suitable method/apparatus, including extrusion and subsequent cutting, pelletizing and the like. As a non-limiting embodiment, pellets may be formed from a mixture of a polyolefin and an amine functionalized wax. A melted mixture may be formed by melting the polyolefin and wax together in any desired order (i.e., sequentially melting one and then melting the other and then mixing; sequentially melting one and then mixing with the other unmelted and then melting the mixture; simultaneously apart and then mixing; simultaneously together; or any other suitable order/arrangement). A solid form of the additive, non-limiting examples of which include, particles, pellets, pills, powder, pastilles, beads, granules, or the like may be formed by any suitable method with any suitable apparatus including extrusion, pelletizing, cutting, chopping and the like.

Any suitable pelletizing/micronizing method and apparatus may be utilized to form a particulate modifier or modifier composition. Common traditional micronization techniques are based on friction to reduce particle size, and such methods include milling, bashing and grinding. A typical industrial mill is composed of a cylindrical metallic drum that usually contains steel spheres. As the drum rotates, the spheres inside collide with the particles of the solid, thus crushing them towards smaller diameters. In the case of grinding, the solid particles are formed when the grinding units of the device rub against each other while particles of the solid are trapped in between. Methods like crushing and cutting are also used for reducing particle diameter but produce more rough particles compared to the two previous techniques (and are therefore the early stages of the micronization process). Crushing employs hammer-like tools to break the solid into smaller particles by means of impact. Cutting uses sharp blades to cut the rough solid pieces into smaller ones. There are also cryogenic techniques for micronizing. For example, some methods use supercritical fluids in the micronization process. The most widely applied techniques of this category include the RESS process (Rapid Expansion of Supercritical Solutions), the SAS method (Supercritical Anti-Solvent) and the PGSS method (Particles from Gas Saturated Solutions).

The method and sequence of steps employed to produce a rubber-modified asphalt composition comprising unmodified asphalt and the asphalt modifier package can be by any of the methods and equipment as generally known in the art. However, as a practical consideration, the addition of the asphalt modifier package and the blending with the unmodified asphalt can, in one embodiment, be carried out in conjunction with an already hot asphalt isolated/produced during oil refining operations.

An asphalt binder composition can be produced by, for example, combining an asphalt, an amine functionalized wax, and an elastomeric polymer in a mixer by dry blending or by the conventional masterbatch technique, or the like. The mixture can be subject to suitable conditions such as heating to a range of about 120° C. to about 240° C. or to molten stage in any suitable vessel such as a mixing tank or a reactor or a metal can.

In one embodiment, a molten mixture can be heated under a pressure that can accommodate the temperature range, such as atmospheric pressure, for about 0.25 to about 35 hours, for instance from about 2 to about 30 hours, or from about 5 to about 25 hours in some embodiments. A molten mixture can be mixed by, for example, a mechanical agitator or any other mixing means.

A rubber-modified asphalt can be produced in a high-shear mill process or in a low-shear mixing process, as is well known to one skilled in the art. The process used can depend on the equipment available and on the particular modifiers used. Polymers that can be used in low-shear mixing equipment can usually be processed in high-shear equipment also. Either type of equipment can be used. A solvent may or may not be used to disperse polymers that are typically processed in high-shear equipment into asphalt using low-shear mixing equipment.

A modifier package can be used in any conventional hot mix asphalt. In one embodiment, the modifier package may be first added to an asphalt binder and the rubber-modified asphalt may then be added to an aggregate mix in a continuous drum mixer or batch mixer. Alternatively, one or more components of a modifier package may be added directly to an aggregate mix in a continuous drum mixer or a batch mixer at about the same time that the asphalt comes into contact with the aggregate. Non-limiting embodiments of the present invention include an asphalt/aggregate formulation, for instance for the pavement of road surfaces, in which the formulation includes a mixture of asphalt, aggregate and a modifier package, wherein the modifier package is present in the rubber-modified asphalt binder in an amount of from about 0.2% to about 30% by weight of the unmodified asphalt.

A modifier package may be used for surface dressings, such as hot applied chip seals, slurry seals, and such surface dressings as a viscosity reducer, and to eliminate the use of volatile cut-back solvents and associated fume emissions. Such warm mix applications may also include coatings and sealants for moisture protection as well as solvent and chemical resistance mixtures.

In one embodiment, a modifier package may be used in roofing applications. By way of example, a modifier package may be utilized in manufacture of roofing shingles in which a rubber-modified asphalt as described can be coated onto the non-woven substrate (usually glass fiber) of a roofing shingle.

In one embodiment, a modifier package can be utilized in forming built-up roofing (BUR) asphalt grades or mopping asphalt grades, which can then be used for hot applied or emulsion applied asphalt coatings.

In another embodiment, a modifier package may be used in manufacture of adhesive coatings for roofing applications.

Modifier packages as described may be used in asphalt feed stocks prior to blowing to harden the binder through oxidation. As a non-limiting example, a modifier package can be present in a rubber-modified asphalt in a range of from about 0.5% to about 10% by weight of the rubber-modified asphalt, although more than about 10 wt. % and less than 0.5 wt. % are also encompassed herein.

The present disclosure may be better understood with reference to the Examples set forth below.

Example 1

Figure 2:
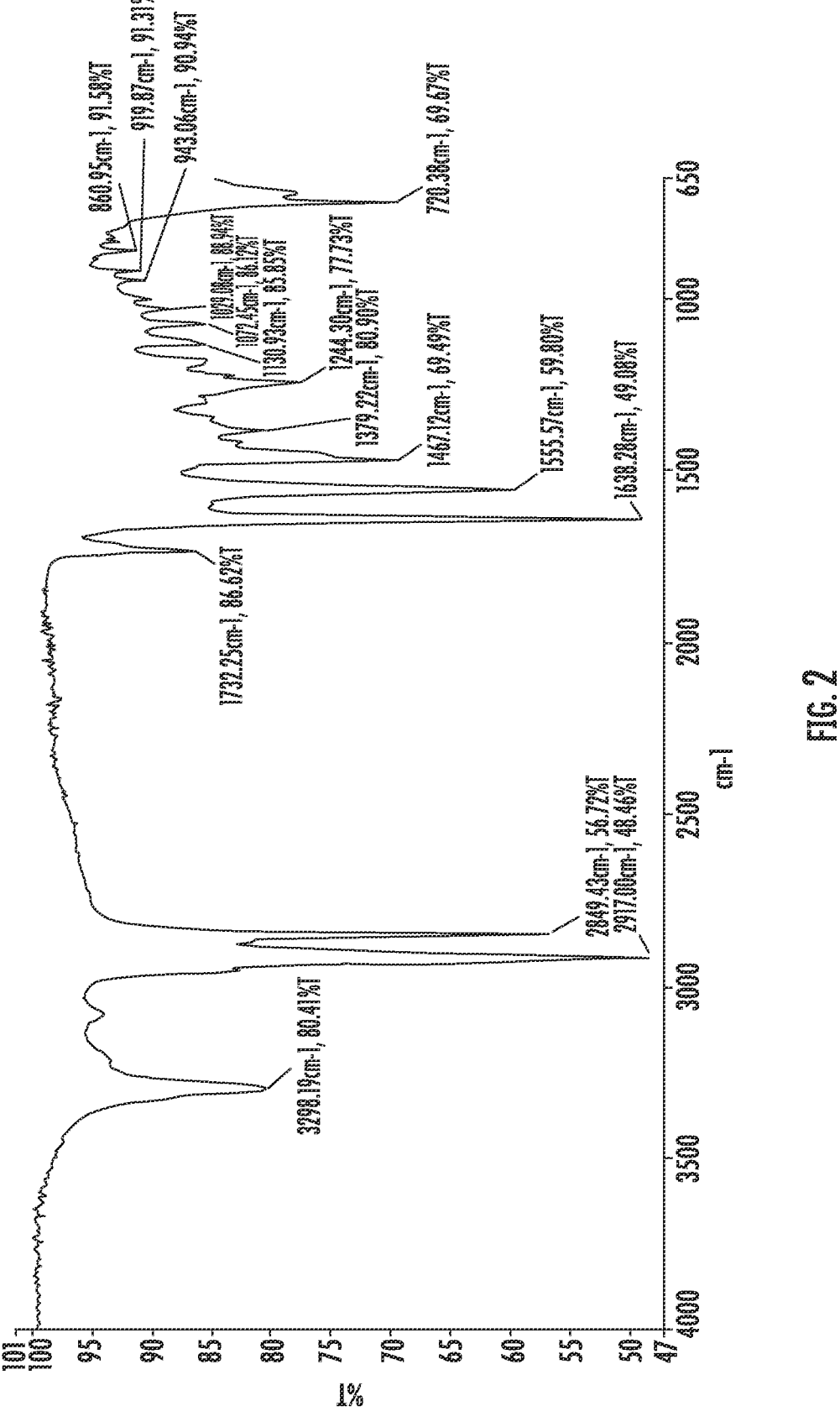
FIG. 2 provides Fourier-transform infrared spectroscopy (FTIR) data for an amine functionalized wax as may be incorporated in an asphalt package as described herein.

A series of modifier packages were formed as shown in Table 1, each including an amine functionalized wax. FIG. 1 and FIG. 2 provide DSC and FTIR data, respectively, of the amine functionalized wax included in the modifier packages. Component add-in levels are provided in Table 1 in parts per weight. Components included an amine functionalized wax (EcoGreen™167 available from Green Asphalt Technologies, LLC), an epoxide modified terpolymer (Elvaloy® 5170 (package 1 and 2), Elvaloy® 4170 (package 3 and 4), both available from Dow Chemical), GTR (MicroDyne™ MD-400-TR available from Lehigh Technologies), or recycled polypropylene having a melt flow index of 25.

TABLE 1

| Modifier Package No. | 1 | 2 | 3 | 4 |
|---|---|---|---|---|
| Amine functionalized wax | 50 | 50 | 50 | 50 |
| Epoxide Modified Terpolymer | 60 | 100 | 60 | 100 |
| GTR | 750 | 750 | 750 | 750 |
| Recycled Polypropylene | 140 | 100 | 140 | 100 |
| Totals | 1000 | 1000 | 1000 | 1000 |

Modifier packages described in Table 1 were combined with asphalt (Hunt PG 67-22) to form a rubber-modified asphalt binder. The rubber-modified asphalt binders are described below in Table 2, with the weight percentage of the modifier package as defined in Table 1 shown in Table 2, the remainder of the modified binder being asphalt binder.

TABLE 2

| | Composition |
|---|---|
| Binder 1 | 9.3 wt. % Modifier Package No. 1 |
| Binder 2 | 9.3 wt. % Modifier Package No. 2 |
| Binder 3 | 9.3 wt. % Modifier Package No. 2 |

TABLE 2-continued

| | Composition |
|---|---|
| Binder 4 | 11 wt. % Modifier Package No. 3 |
| Binder 5 | 11 wt. % Modifier Package No. 4 |

Binder No. 3 included modifier package No. 2 with all of the modifier components added separately to the asphalt. Binder Nos. 1, 2, 4, and 5 included modifier packages in which all components were compounded together and pelletized prior to addition of the modifier package to the asphalt binder. The compounding was via using a thermoplastic extrusion process: All materials were dry blended as a 1 kg batch prior to feeding into the extrusion hopper. The extruder was a 30 mm co-rotating twin screw extruder with barrel temperatures ranging from 320° F. at the feed zone to 380° F. at the die. 3 mm diameter strands were extruded and then pelletized after passing through a cooling water bath.

The modified asphalt binders thus formed were evaluated for storage separation value (ASTM D 7173) and rotational viscosity at 135° C. (AASHTO T 316). RTFO residue tests were carried out to determine MSCR $J_{nr}$ and % recovery at 67° C. and 3.2 kPa (AASHTO M 332-18), and dynamic shear rheometer phase angle and complex modulus at 76° C. (AASHTO T 315). Results are shown in Table 3, below.

TABLE 3

| Binder No. | 1 | 2 | 3 | 4 | 5 |
|---|---|---|---|---|---|
| Storage Separation Value (Bottom-Top), F. | 0.3 | 1.1 | 2.7 | −1.0 | −2.8 |
| Rotational Visc., 135 C., cps | 2875.0 | 3250.0 | 4150.0 | 4450.0 | 4825.0 |
| MSCR 67 C., Jnr @ 3.2 kPa | 0.3824 | 0.4997 | 0.2910 | 0.2313 | 0.2403 |
| % Rec. @ 3.2 kPa | 26.99% | 31.55% | 48.48% | 42.97% | 50.50% |
| % Diff in Jnr | 35.07% | 49.81% | 52.11% | 23.11% | 34.99% |
| Dynamic Shear Rheometer | | | | | |
| Phase Angle, degrees | 72.1 | 70.3 | 67.0 | 65.9 | 65.1 |
| G* @ 10 rad/sec, kPa | 3.76 | 4.00 | 4.45 | 6.07 | 5.03 |
| G*/sin delta @ 10 rad/sec, kPa | 3.95 | 4.25 | 4.83 | 6.65 | 5.54 |

As can be seen, all of the binders exhibited an excellent storage stability as well as other physical characteristics. Moreover, Binder Nos. 1, 2, and 3, which included the additive package in an amount of less than 10 wt. %, exhibited these desirable characteristics even at the low add-in level. In addition, in this example, in which the modifier packages all included an amine-functionalized wax, the compounding of the components together prior to mixing with the asphalt, which was done in Binder Nos. 1, 2, 4, and 5, did not appear to have a strong effect on the measured characteristics, as Binder No. 3, in which the components of the modifier package were added separately to the asphalt, also exhibited excellent characteristics.

Example 2

A series of modifier compositions were formed including a reactive terpolymer and GTR, as shown in Table 4, below. The modifier compositions were formed by compounding all of the components and pelletizing the compounded materials. The compounding was via using a thermoplastic extrusion process: All materials were dry blended as a 1 kg batch prior to feeding into the extrusion hopper. The extruder was a 30 mm co-rotating twin screw extruder with barrel temperatures ranging from 320° F. at the feed zone to 380° F. at the die. 3 mm diameter strands were extruded and then pelletized after passing through a cooling water bath. Components included an epoxide modified terpolymer (Elvaloy® 5170 available from Dow Chemical), GTR (Micro-Dyne™ MD-400-TR available from Lehigh Technologies), a surfactant (PC-2014 available from the Ingevity Co.), recycled polypropylene having a melt flow index of 25, a polypropylene/polyethylene copolymer (Vistamaxx™ 6502 available from the ExxonMobil™ Corporation) or a co-reactant (trimellitic anhydride). Component add-in levels are provided in Table 4 in parts per weight.

TABLE 4

| Modifier Package No. | 5 | 6 | 7 | 8 |
|---|---|---|---|---|
| Epoxide Modified Terpolymer | 60 | 60 | 60 | 100 |
| GTR | 750 | 750 | 750 | 750 |
| Surfactant | 50 | 50 | 50 | 50 |
| Recycled Polypropylene | 140 | 120 | | 100 |
| Polypropylene/polyethylene copolymer | | | 140 | |
| Co-reactant | | 20 | | |
| Totals | 1000 | 1000 | 1000 | 1000 |

Compounded and pelletized modifier packages described in Table 4 were combined with asphalt (Hunt PG 67-22) to form a rubber-modified asphalt binder. The rubber-modified asphalt binders are described below in Table 5, with the weight percentage of the modifier package as defined in Table 4 shown in Table 5, the remainder of the modified binder being asphalt binder.

TABLE 5

| | Composition |
|---|---|
| Binder 6 | 9.3 wt. % Modifier Package No. 5 |
| Binder 7 | 9.3 wt. % Modifier Package No. 6 |
| Binder 8 | 9.3 wt. % Modifier Package No. 7 |
| Binder 9 | 9.3 wt. % Modifier Package No. 8 |
| Binder 10 | 11 wt. % Modifier Package No. 8 |

The modified asphalt binders thus formed then were evaluated for rotational viscosity at 135° C. (AASHTO T 316) and separation value (ASTM D 7173). RTFO residue tests were carried out to determine MSCR $J_{nr}$ and % recovery at 67° C. and 3.2 kPa (AASHTO M 332-18), and dynamic shear rheometer phase angle and complex modulus at 76° C. (AASHTO T 315). Results are shown in Table 6, below.

TABLE 6

| Binder No. | 6 | 7 | 8 | 9 | 10 |
|---|---|---|---|---|---|
| Storage Separation Value (Bottom-Top), F. | 1.5 | 13.5 | 3.9 | 2.9 | 0.8 |
| Rotational Visc., 135 C., cps | 2563.0 | 2400.0 | 2175.0 | 2362.0 | 3862.0 |
| MSCR 67 C., Jnr @ 3.2 kPa | 0.6180 | 0.6145 | 0.6155 | 0.6520 | 0.2915 |
| % Rec. @ 3.2 kPa | 24.88% | 18.62% | 25.26% | 26.84% | 41.12% |
| % Diff in Jnr | 27.23% | 27.71% | 28.45% | 39.17% | 35.61% |
| Dynamic Shear Rheometer | | | | | |
| Phase Angle, degrees | 73.2 | 74.4 | 71.9 | 71.4 | 66.3 |
| G* @ 10 rad/sec, kPa | 3.45 | 3.56 | 3.37 | 3.30 | 5.21 |
| G*/sin delta @ 10 rad/sec, kPa | 3.60 | 3.69 | 3.55 | 3.48 | 5.69 |

As can be seen, Binder Nos. 6, 8, 9, and 10 exhibited excellent storage stability, while Binder No. 7, which included modifier package No. 6 that included a co-reactant, had a much higher storage stability. This is believed to be due to excess reaction of the modifier components within the compounded particles of modifier package No. 6. In addition, the binders exhibited excellent physical characteristics, even at low add-in levels to the asphalt binder of less than 10 wt. %.

Example 3

Two modifier compositions were formed including identical components, as shown in Table 7 below. Components included an epoxide modified terpolymer (Elvaloy® 5170 available from Dow Chemical), GTR (MicroDyne™ MD-400-TR available from Lehigh Technologies), a surfactant (PC-2014 available from the Ingevity Co.), and recycled polypropylene having a melt flow index of 25. Modifier package No. 9 was formed by compounding all of the components and pelletizing the compounded material. The compounding was via using a thermoplastic extrusion process: All materials were dry blended as a 1 kg batch prior to feeding into the extrusion hopper. The extruder was a 30 mm co-rotating twin screw extruder with barrel temperatures ranging from 320° F. at the feed zone to 380° F. at the die. 3 mm diameter strands were extruded and then pelletized after passing through a cooling water bath. The components of modifier package No. 10 were maintained separately.

TABLE 7

| Modifier Package No. | 9 | 10 |
|---|---|---|
| Epoxide Modified Terpolymer | 60 | 60 |
| GTR | 750 | 750 |
| Surfactant | 50 | 50 |
| Recycled Polypropylene | 140 | 140 |
| Totals | 1000 | 1000 |

The modifier packages were combined with asphalt (Marathon 67-22) to form a rubber-modified asphalt binder. Each binder included 10.67 wt. % of the modifier package with the remainder of the rubber modified binder being asphalt binder.

The modified asphalt binders thus formed then were evaluated for rotational viscosity at 135° C. (AASHTO T 316) and separation value (ASTM D 7173). RTFO residue tests were carried out to determine MSCR $J_{nr}$ and % recovery at 67° C. and 3.2 kPa (AASHTO M 332-18), and dynamic shear rheometer phase angle and complex modulus at 76° C. (AASHTO T 315). Results are shown in Table 8, below.

Binder No. 11 was formed by combination of the asphalt with the compounded and pelletized modifier package, and Binder No. 12 was formed by separate addition of the modifier package components to the asphalt.

TABLE 8

| Binder No. | 11 | 12 |
|---|---|---|
| Storage Separation Value (Bottom-Top), F. | 4.4 | 11.8 |
| Rotational Visc., 135 C., cps | 2575.0 | 1638.0 |
| MSCR 67 C., Jnr @ 3.2 kPa | 0.8638 | 1.2186 |
| % Rec. @ 3.2 kPa | 28.01% | 16.59% |
| Phase Angle, degrees | 72.8 | 72.9 |
| G* @ 10 rad/sec, kPa | 2.54 | 5.53 |
| G*/sin delta @ 10 rad/sec, kPa | 2.66 | 5.79 |

As can be seen, the compounded modifier package provided a rubber-modified asphalt that exhibited both excellent storage separation value and excellent physical characteristics.

While certain embodiments of the disclosed subject matter have been described using specific terms, such description is for illustrative purposes only, and it is to be understood that changes and variations may be made without departing from the spirit or scope of the subject matter.

What is claimed is:

1. An asphalt modifier package comprising ground tire rubber particles, an amine functionalized wax in an amount of from about 0.01 wt. % to about 10.0 wt. %, and an elastomeric polymer comprising epoxide functionality, wherein the elastomeric polymer is present in the asphalt modifier package in an amount of from about 0.01 wt. % to about 20 wt. %, wherein the amine functionalized wax comprises a hydrocarbon chain of nine carbons or greater and an amine functionality, the amine functionality having the following general structure:

$$—NR_1R_2$$

in which — represents a bond between the amine functionality and the hydrocarbon chain and $R_1$ and $R_2$ are the same or different from one another and are independently selected from hydrogen or C1 to C12 alkyl, wherein when R1 and R2 are each independently a C1 to C12 alkyl, R1 and R2 are optionally interconnected, and wherein the asphalt modifier package exhibits a storage stability separation value of 6° F. or less, as determined according to ASTM D 7173.

2. The asphalt modifier package of claim 1, wherein the amine functionalized wax comprises an amine functionalized natural wax.

3. The asphalt modifier package of claim 2, wherein the amine functionalized natural wax comprises an amine functionalized plant wax.

4. The asphalt modifier package of claim 1, wherein the elastomeric polymer comprises at least one of a reactive elastomeric terpolymer and a styrene-butadiene copolymer.

5. The asphalt modifier package of claim 1, wherein about 10 wt. % or less of the ground tire rubber particles are larger than about 400 microns and about 1 wt. % or less of the ground tire rubber particles are larger than about 600 microns.

6. The asphalt modifier package of claim 1, wherein the ground tire rubber particles comprise ground tire rubber compounded with the elastomeric polymer, the elastomeric polymer comprising a reactive elastomeric terpolymer.

7. The asphalt modifier package of claim 1, wherein the ground tire rubber particles comprise cryogenically ground rubber microparticles.

8. The asphalt modifier package of claim 1, further comprising a polyolefin polymer.

9. The asphalt modifier package of claim 8, the polyolefin polymer comprising at least one of aa polyolefin homopolymer and a polypropylene/polyethylene copolymer.

10. The asphalt modifier package of claim 1, further comprising a polyethylene wax, a Fischer-Tropsch wax, a petroleum paraffin wax, a microcrystalline wax, a Montan wax, a tall oil material, a sulfur source, or a co-reactant.

11. A modified asphalt comprising the asphalt modifier package of claim 1 combined with an asphalt.

12. The modified asphalt of claim 11, wherein the asphalt comprises at least one of straight asphalt, blown asphalt, natural asphalt, and refined asphalt.

13. The modified asphalt of claim 11, wherein the modified asphalt exhibits at least one of a storage stability separation value of about 6° F. or less, an MSCR $J_{nr}$ value at 3.2 kPa of from about 0.05 to about 2, and an MSCR percent recovery of from about 20% to about 75%.

14. The asphalt modifier package of claim 1, wherein when R1 and R2 are each independently a C1 to C12 alkyl, R1 and R2 each independently form a ring structure.

* * * * *